May 19, 1953 R. D. PIKE 2,639,217
PRODUCTION OF SODIUM SESQUICARBONATE FROM CRUDE TRONA
Filed July 29, 1949
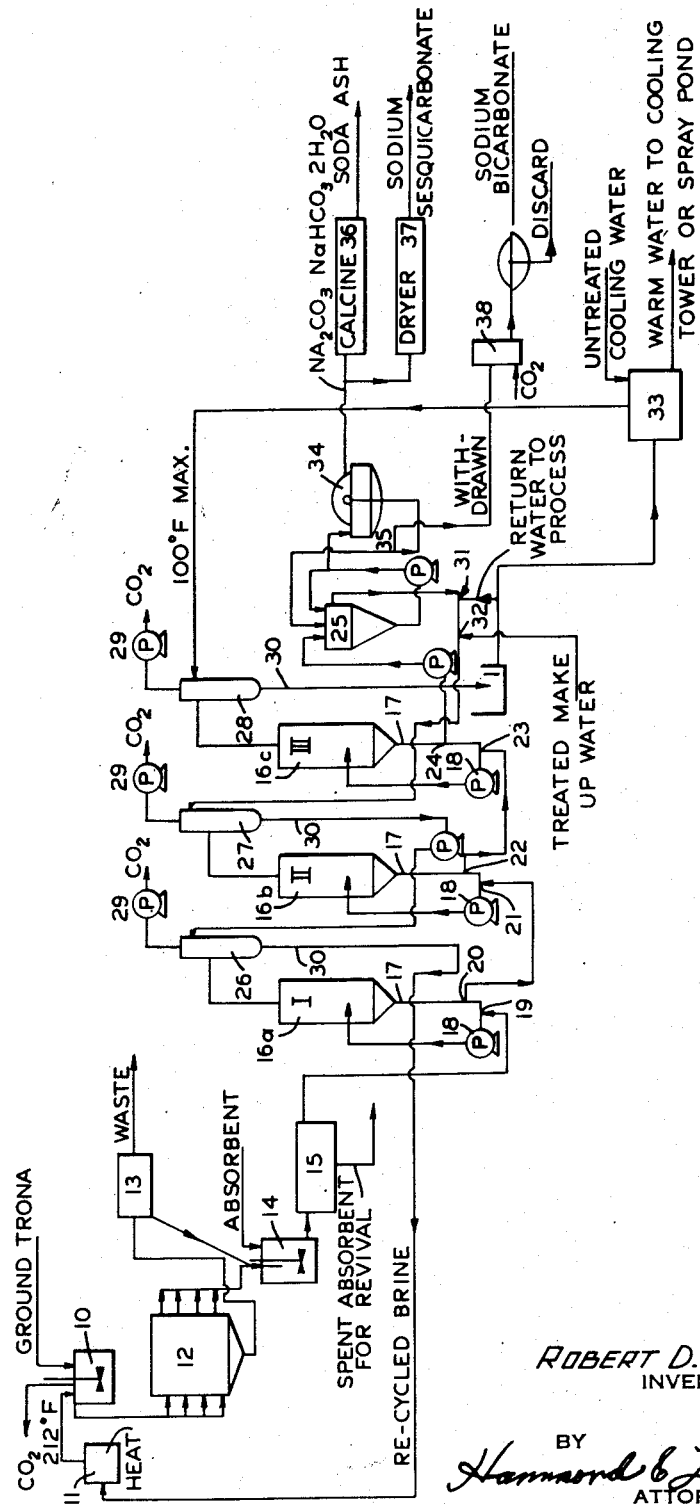
Robert D. Pike
INVENTOR
BY
Hammond & Littell
ATTORNEYS Patented May 19, 1953

2,639,217

UNITED STATES PATENT OFFICE 2,639,217

PRODUCTION OF SODIUM SESQUICARBONATE FROM CRUDE TRONA

Robert D. Pike, Greenwich, Conn.

Application July 29, 1949, Serial No. 107,529

4 Claims. (Cl. 23—63)

This invention is an improvement on the process described in my United States Patent No. 2,346,140, issued April 11, 1944. My earlier invention relates to the production of pure sodium carbonate, specifically, sodium sesquicarbonate and soda ash, from Wyoming trona, or similar materials. As described in said earlier patent, use is made of a recycling brine made up principally of a solution of sodium carbonate and bicarbonate in water, the former greatly predominating in concentration. This brine is heated to at least about 185° F. and used to dissolve the raw trona. The hot solution is clarified to remove shale, and is then subjected to treatment by an adsorbent material, such as activated carbon, to remove organic and coloring matter. This matter imparts a yellowish color to the solution of trona, which is entirely removed by the use of a very small amount of activated carbon. The carbon is then removed by filtration and the water-white solution cooled, thereby crystallizing out sodium sesquicarbonate of high purity and dead-white color. In said earlier patent, I have illustrated the use of eight stages of vacuum crystallizers, cooling the salt solution from about 185° F. to about 86° F. I also protected the recycled brine against the loss of $CO_2$ by operating in closed vessels and providing an atmosphere of $CO_2$.

I have found that by modifying the process described in my prior patent to provide for the solution and crystallization of the salt over a temperature range of about 212° F. to 140° F., and using open tanks for dissolving and taking no precautions to prevent the loss of $CO_2$, a substantial improvement in operation can be realized. A certain loss of $CO_2$ occurs in my present process due to decomposition of some of the sodium bicarbonate component of the recycling brine, but this is more than compensated for by other economies and advantages of the process herein described.

I have found also that by bleeding or removing a certain percentage of the recycling brine in addition to that which is removed with the recovered crystals, it is possible to keep its concentrations of NaCl and $Na_2SO_4$ which are introduced with the trona, and which tend to build up in the recycled brine, low enough so that the sodium sesquicarbonate crystals can be dried, or calcined without washing, while producing a product of high purity.

I have also found, that I may produce unwashed crystals of sodium sesquicarbonate of high purity by removing just that amount of the recycling brine which, if combined with the $CO_2$ which is lost, would produce an analysis of material having the same relative proportions of $Na_2CO_3$ and $NaHCO_3$ which exists in trona. By this process I remove principally trona and water from the system, and as I introduce trona and water to the system, to make up for that removed in the bleed, and for other losses, I keep the analysis of the recycling brine stable and substantially unchanging, without the necessity for adding soda ash, as described in my earlier patent, or for adding $CO_2$ to the circulation.

Furthermore, I have found that by the practice of my present invention, I increase the production of sodium sesquicarbonate crystals from equipment of given size by as much as 16%, as compared with my former practice. This saving is largely due to the fact that the added makeup water dissolves trona, while keeping the analysis of the recycled brine constant. Furthermore, the quantity of the bleed required to keep the NaCl concentration of the recycled brine well below .8% and the $Na_2SO_4$ concentration well below .45% is relatively small. These low concentrations of NaCl and $Na_2SO_4$ result in considerably increasing the solubility of trona in the recycling brine, thus imparting higher production to the cycle.

I may, if desired, treat the bled, or withdrawn, portion of the recycling brine for recovery of its carbonate values, notably, by carbonation with $CO_2$ containing gas in a well known manner, to precipitate most of the $Na_2O$ present as relatively insoluble sodium bicarbonate, which is readily marketable, although treatment to recover the carbonate values of the bled off portion is not necessary for the economical use of the process herein described.

It is therefore the object of my invention to provide an improved process for the recovery of sodium carbonate or sodium sesquicarbonate from naturally occurring trona which will be more economical and less difficult to use than that described in my prior patent.

Another object of my invention is to provide a process for recovering sodium carbonate or sodium sesquicarbonate from trona which can be operated at higher temperatures than those described in my said prior patent without undue precautions against the loss of $CO_2$ from the circulating brine or without provisions for the addition of $CO_2$ to the circulating brine.

Various other objects and advantages will appear as this description proceeds.

I shall now describe an embodiment of my invention by reference to Fig. 1, which is a diagrammatic outline of the process and follow this description by an example of its use for producing 100,000 tons soda ash annually.

In the drawing, 10 represents an agitating vessel for dissolving ground trona in recycled brine which has been heated in 11 to about 212° F. I preferably grind the trona so that all will pass a 20 mesh screen. Two or three dissolving vessels may be used in series so as to make a substantially saturated solution, or this may be done by dissolving in batches in a well known manner, as may be preferred. The saturated solution then goes to 12, which is preferably a four tray parallel feed thickener, insulated heavily against the loss of heat. The thickened underflow of this thickener passes to a centrifuge 13, or other well known suitable dewatering device in which shale and other insoluble material found in natural trona is removed. The brine removed in 13 joins the clarified overflow from 12 and the insoluble residue is discarded to waste. I may employ all or a part of the makeup water referred to later, to wash the insoluble material in 13 free of brine, and return this wash to the main stream of makeup water.

The combined streams of recycled brine from 12 and 13 go to an agitating treating tank 14 where the brine is retained about half an hour in agitated contact with activated adsorbent carbon, in amount corresponding to about .3% of the trona introduced. This treatment also may be done either in continuous flow or batches. This treatment removes organic and coloring matter and after the recycled brine is filtered in 15, a water-white solution results, which is quite free from iron and will not foam in the vacuum crystallizers. The spent adsorbent removed from filter 15 may be discarded or revived for reuse.

The clarified hot saturated brine now enters the first effect of a series of vacuum crystallizers, 16a, b and c. I usually prefer to employ three crystallizers in series, which is the number shown in the drawing. However, the number of crystallizer effects is dictated by considerations of economy and I may carry out my process, if desired, with the use of a single effect.

A separate recirculation of brine is maintained through each effect by withdrawing a slurry of brine and crystals through a barometric leg 17 from the bottom of each effect, and pumping it back by pumps 18 into the main bodies of the effects. The circulating brine from 15 enters the recirculation of the first effect at 19 and leaves at 20, entering the recirculation of the second effect at 21 and leaving at 22, entering the recirculation of the third effect at 23 and leaving at 24, whence it is pumped into crystal settler 25.

The amount of recirculation, just referred to, in each effect, may be controlled by the operator within limits, and this in turn controls the so-called flash range of the vacuum crystallizers. The flash range is the difference in temperature between that prevailing in the crystallizer and that of the recirculating feed to the crystallizer. For example, the feed entering at 19 is at a temperature of about 212° F. and that leaving at 24 is at about 140° F. This latter is therefore the prevailing temperature in the third effect 16c. The prevailing temperature in the second effect 16b, is about 164° F. and in the first effect 16a, about 188° F. A flash range in each crystallizer may be chosen over a wide range from, say 1° F. to 7° F. For the purpose of this description, it will be assumed that the flash range is 4° F.

This means that the recirculation in each effect must be approximately 2.5 times the net circulation through the system. In this example, the pressure in the third effect is 4.9" Hg absolute, about 13" Hg absolute in the second effect, and about 21" Hg absolute in the first effect.

The separate effects are each provided with jet condensers 26, 27, 28. Each condenser is provided with a top connection to a vacuum pump 29 for removing $CO_2$ and any other non-condensable gases, and each is provided with a barometric leg 30. Condenser 28, which is connected to the third, or last, effect of the series of crystallizers, is supplied with a spray of pure water at a maximum temperature of about 100° F. The water which is evaporated in this effect under the influence of the vacuum, is withdrawn and returned to the circulation at 31, at a temperature of about 125° F. Cold pure makeup water, some of which may have been used as a wash in 13, is introduced at 32. I find it preferable to introduce the water in the region of 31 and 32, because this immediately removes the saturation of the recirculating brine and from that point in its flow, until it again reaches vessel 10, it is unsaturated and cannot, therefore, deposit crystals in the pipe lines. The balance of the water introduced into 28 amounting to about 950 G. P. M., has been cooled in tubular cooler 33, on the outside of the piping of which, flows cold untreated water from a spray pond, or tower, not shown. In this way the treated water which is evaporated in the third effect is saved and returned to the system. Whereas, if the condenser 28 had been provided with untreated water, the pure water would have been contaminated by untreated water.

I have pointed out that the net circulation from the third effect 16c is withdrawn at 24 and pumped to settler 25. The underflow from 25 is a thickened slurry of crystals of sodium sesquicarbonate, which is dewatered in a vacuum filter or centrifuge 34. I prefer not to wash these crystals when using my process to treat the Green River, Wyoming, trona, or at most to wash them only partially, because the content of NaCl, $Na_2SO_4$ and other soluble salts in this trona is so low that withdrawing a very small part of the circulating brine at 35 as shown, together with the brine remaining with the crystals from 34, I keep the concentration of NaCl and $Na_2SO_4$ in the recycling brine at so low a level that the amount of these materials added to the sodium sesquicarbonate crystals by the adhering brine, is within permissible limits to allow this product to be classed as chemically pure. In order to accomplish this end, however, I find it desirable to treat the water of the Green River region, which is used for makeup, by ion exchange or other suitable treatment in order to remove $Na_2SO_4$ and NaCl from it before it is used in the process.

The product of my process, which is substantially pure sodium sesquicarbonate,

$Na_2CO_3.NaHCO_3.2H_2O$ may be calcined in any suitable device 36, to make soda ash of high purity or may be dried in drier 37 to produce highly pure crystals of sodium sesquicarbonate. The brine withdrawn at 35 may be treated with $CO_2$ in 38 to recover most of its $Na_2O$ as sodium bicarbonate. However, the amount of the latter thus recovered, is relatively small and I may, if I prefer, discard the withdrawn brine without serious economic loss, The overflow from the settler 25 is at a temperature of about 140° F. This temperature is lowered and the brine somewhat diluted by the addition of makeup and recovered water at 31 and 32, as disclosed above. This brine is then used as the condensing spray in barometric condenser 27, which serves the second effect. This somewhat further dilutes and heats the brine, which is then used as the condensing spray in 26. The brine leaving 26, through the barometric leg 30, may be heated as high as 165° F., and is the recycled mother liquor which goes to heater 11, preparatory for reuse for dissolving trona in 10.

As shown in my earlier patent, this recycled mother liquor should have a composition of about 5 grams $NaHCO_3$ and 23½ grams $Na_2CO_3$ at 86° F. But as in my present invention, I prefer to have the recycling mother liquor leaving the crystal settler 25 at a temperature of about 140° F. the corresponding composition is about 7.7 sodium bicarbonate and 28.4 grams sodium carbonate per 100 grams water.

In the process which I have just described, there are several points at which $CO_2$ is lost by decomposition of the sodium bicarbonate of the circulating brine, notably, from the dissolver 10, the thickener 12, and from the discharge of each of the vacuum pumps 29. I have discovered that I may regulate the withdrawal at 35 within practical limits so that this withdrawn brine taken together with the brine which adheres to the crystals, which is also withdrawn because the crystals are not washed, or at least are washed only partially, and with the lost $CO_2$, forms a combination of materials which may be expressed as a mixture of trona and water. As I add trona and water to the cycle, I therefore keep the relative proportions of $NaHCO_3$ and $Na_2CO_3$ at their constant desired relationship, without having to control this by adding $CO_2$, or by recirculating calcined soda ash to the circulating brine. I have found that my discovery and application of this relationship, leads to greater economy and ease of control in the operation of the process, as compared with my earlier invention. I also produce approximately 16% more product from a plant of given size.

In what follows, I shall set forth the principal data concerned with producing 100,000 tons soda ash annually.

*Example*

A representative analysis of the Wyoming trona is as follows:

| Constituent | As Is | Calcined Basis |
|---|---|---|
| $Na_2CO_3$ | 45.21 | 94.92 |
| $NaHCO_3$ | 35.86 | |
| $H_2O$ | 15.33 | |
| $H_2O$ insoluble | 3.4 | 4.79 |
| Iron ($Fe_2O_3$) | .075 | .11 |
| NaCl | .0854 | .12 |
| $Na_2SO_4$ | .0356 | .05 |
| $Na_2B_4O_7$ | .004 | .005 |

The composition of the mother liquor used to dissolve the trona, is about as follows:

| Constituent | Percent | Lbs./100 Lbs. $H_2O$ |
|---|---|---|
| $NaHCO_3$ | 5.62 | 7.7 |
| $Na_2CO_3$ | 20.70 | 28.4 |
| NaCl | .54 | .735 |
| $Na_2SO_4$ | .21 | .306 |
| $H_2O$ | 72.91 | |

| | |
|---|---|
| Lbs. of trona treated per hour | 39,300 |
| Weight of dry crystals $Na_2CO_3 \cdot NaHCO_3 \cdot 2H_2O$ produced lbs./hr | 37,400 |
| Lbs./hr. recycled mother liquor: | |
| $\quad$ NaHCO | 14,600 |
| $\quad Na_2CO_3$ | 54,600 |
| $\quad$ NaCl | 1,400 |
| $\quad Na_2SO_4$ | 570 |
| $\quad$ Water | 208,000 |
| $\qquad$ Total, approximately | 278,000 |
| Mols per hr. $CO_2$ lost | 2.68 |
| Lbs./hr. $CO_2$ lost | 118 |
| Lbs./hr. $Na_2CO_3$ in the brine withdrawn and with the crystals to give a trona analysis with the $NaHCO_3$ in the brine and with the lost $CO_2$ | 1,297 |
| $NaHCO_3$ in brine withdrawn and with crystals lbs./hr. | 351 |
| $H_2O$ withdrawn and with crystals lbs./hr. | 4,570 |
| Water with sodium sesquicarbonate crystals, lbs./hr. (this is a constant) | 3,930 |
| Water withdrawn, lbs./hr. (this is a variable to match the loss of $CO_2$. If the latter increases, the amount withdrawn also increases) | 670 |
| The amount of NaCl added with the trona is lbs./hr. | 33.6 | and as this must be removed with the water withdrawn and in the crystals, the concentration of NaCl, expressed as lbs. NaCl per 100 lbs. water is $$\frac{33.6}{4570} \times 100 = .735$$

| | |
|---|---|
| Same concentration for $Na_2SO_4$ | .306 |
| NaCl in soda ash (this results from the NaCl in the mother liquor adhering to the crystals of sodium sesquicarbonate) percent | .111 |
| Same for $Na_2SO_4$ | .047 |

Total material in brine adhering to unwashed crystals, lbs./hr.:

| | |
|---|---|
| $NaHCO_3$ | 303 |
| $Na_2CO_3$ | 1,115 |
| Equivalent sodium sesquicarbonate | 1,860 |
| Equivalent percentage of total produced | 5.0 |
| NaCl | 28.9 |
| $Na_2SO_4$ | 12.0 |
| $H_2O$ | 3,930 |

The circulating brine withdrawn contains the following lbs./hr.:

| | |
|---|---|
| $NaHCO_3$ | 46 |
| $Na_2CO_3$ | 178 |
| Equivalent sodium sesquicarbonate | 295 |
| Per cent of total produced | .79 |

(This loss is so small that recovery by carbonation, as indicated in 38, is entirely optional.)

Mol ratio, $Na_2CO_3/NaHCO_3$ in unwashed crystals __ 1.035

(This is a satisfactory ratio, comparing as it does with 1.00 in pure sodium sesquicarbonate.)

| | |
|---|---|
| Makeup water, lbs./hr. (including that withdrawn and with the crystals, plus about 2,000 lbs./hr. lost with the waste from filter 13 and with the adsorbent from filter 15) | 6,570 |
| Pure water returned to process from condenser 28 lbs./hr. | 11,640 |
| Lbs. water per hr. which must be heated from about 165° to 212° F. (this is the amount entering the crystal settler 25, plus makeup plus water returned from condenser 28) | 208,000 |
| B. t. u./hr. to heat water | 9,870 |
| B. t. u./hr. to heat solids in solution | 810,000 |
| $\qquad$ Total | 10,680 |

To this must be added the fuel required to calcine the crystals of sodium sesquicarbonate or to dry them.

Summing up, in the practice of my process, when the loss of $CO_2$ is 118 lbs./hr., I withdraw sufficient of the circulating brine so that with the brine which adheres to the unwashed crystals, I have withdrawn the following lbs./hr.

| | |
|---|---|
| $NaHCO_3$ | 303+46=349 |
| $Na_2CO_3$ | 1,115+178=1,293 |
| $H_2O$ | 3,930+670=4,600 |
| NaCl | 33.6 |
| $Na_2SO_4$ | 14.0 |

The 118 lbs./hr. $CO_2$ would react with $Na_2CO_3$ as follows:

$$Na_2CO_3 + CO_2 + H_2O \rightarrow 2NaHCO_3$$

and if this reaction were actually allowed to occur, it would use up about 284 lbs. $Na_2CO_3$, and make 451 lbs. $NaHCO_3$. This would give:

| | |
|---|---|
| $NaHCO_3$ | 800 |
| $Na_2CO_3$ | 1,009 |
| Weight ratio, $NaHCO_3/Na_2CO_3$ | .79 |

This same ratio occurs in trona, which shows that I have virtually operated my process with depletion only of trona and water, together with the NaCl and $Na_2SO_4$ introduced with the trona, and that because I also introduce trona and water into the circulation, I therefore may operate the process continuously with substantially unvarying composition of the circulation, with minimum losses, maximum yield, and a product of the highest purity.

While I have described a preferred method of practicing my invention, it will be understood that various modifications and changes may be made from that described without departing from the spirit of my invention or the scope of the appended claims.

What is claimed is:

1. A process for the production of sodium sesquicarbonate from crude trona which comprises dissolving the trona in a circulating system open to the atmosphere in a recirculating solution of sodium carbonate and sodium bicarbonate containing a greater concentration of the normal carbonate than of the bicarbonate at a temperature not substantially less than the boiling point of the recirculating solution with consequent substantial loss of $CO_2$ from the circulating system, crystallizing and separating sodium sesquicarbonate by cooling, and maintaining the ratio of concentrations of sodium carbonate and sodium bicarbonate in the recirculating solution substantially constant by withdrawing from the circulation the stoichiometric amount of solution corresponding to the amount of $CO_2$ lost to restore the desired sodium carbonate to sodium bicarbonate concentration, and recirculating the remainder of said solution of sodium carbonate and sodium bicarbonate and dissolving more trona therein.

2. A process for the production of sodium sesquicarbonate from crude trona which comprises dissolving the trona in a circulating system open to the atmosphere in a recirculating solution of sodium carbonate and sodium bicarbonate containing a greater concentration of the normal carbonate than the bicarbonate at a temperature not substantially less than the boiling point of the recirculating solution with consequent substantial loss of $CO_2$ from the recirculating system, crystallizing and separating sodium sesquicarbonate by cooling and withdrawing from the solution the stoichiometrical amount of solution corresponding to the $CO_2$ lost to bring the solution back to the desired ratio of normal carbonate to bicarbonate, adding make-up water, and recirculating the remainder of said solution together with the necessary make-up water to dissolve additional crude trona.

3. A process for producing sodium sesquicarbonate from naturally occurring trona, carrying organic matter, which comprises dissolving the trona in a circulating system open to the atmosphere in a recirculating brine of sodium carbonate and sodium bicarbonate containing substantially more normal carbonate than bicarbonate at a temperature not substantially less than the boiling point of the recirculating solution with consequent substantial loss of $CO_2$ from the recirculating system, contacting the solution with an adsorbent and thereby removing said organic matter, separating the solution from said adsorbent and organic matter, crystallizing and separating sodium sesquicarbonate from the solution by cooling, and maintaining the ratio of sodium carbonate and sodium bicarbonate in the recirculating solution at the desired amount by withdrawing from the solution, including the solution remaining with the crystals of sodium sesquicarbonate, the stoichiometric amount of solution corresponding to the amount of $CO_2$ lost.

4. The method of producing refined sodium sesquicarbonate from naturally occurring trona carrying insoluble material and coloring matter, which comprises dissolving the trona in a circulating system open to the atmosphere in a recycling brine of sodium carbonate and bicarbonate at a temperature of not substantially less than the boiling point of the recirculating solution with consequent substantial loss of $CO_2$ from the recirculating solution, removing the insoluble material from said solution, contacting the solution with an adsorbent and removing the adsorbent and coloring matter from said solution, crystallizing and separating sodium sesquicarbonate by cooling, and maintaining the ratio of concentrations of sodium carbonate and sodium bicarbonate in the recycling solution at the desired amount by withdrawing from the solution, including the solution remaining with the crystals of sodium sesquicarbonate, the stoichiometric amount corresponding to the $CO_2$ lost, and recycling the remaining solution to dissolve more trona.

ROBERT D. PIKE.

References Cited in the file of this patent

UNITED STATES PATENTS

| Number | Name | Date |
|---|---|---|
| 1,319,128 | Watson | Oct. 21, 1919 |
| 1,618,834 | Kuhnert | Feb. 22, 1927 |
| 2,346,140 | Pike | Apr. 11, 1944 |
| 2,388,009 | Pike | Oct. 30, 1945 |